Patented Dec. 22, 1931

1,837,543

UNITED STATES PATENT OFFICE

TURE ROBERT HAGLUND, OF STOCKHOLM, SWEDEN

PROCESS FOR PRODUCING PRODUCTS CONTAINING BOTH A SULPHIDE AND ALUMINUM OXIDE

No Drawing. Application filed October 24, 1929, Serial No. 402,308, and in Sweden November 2, 1928.

The present invention is an improvement on the patented process shown in Patent No. 1,772,936 and relates to a process for producing a product containing both aluminum oxide as well as one or more of such sulphides as BaS, MgS, $Al_2S_3$, by fusing a material which contains the aluminum oxide and reducing said material in the electric furnace. The aluminum oxide material is fused together with a carbonaceous reducing agent, and at least a part of the named sulphide content is formed in the process by desulphurizing a sulphide of a heavy metal. According to the invention such sulphide of a heavy metal is added at least in considerable proportion, in such form that it tends, during the fusing, to form relatively large drops or lumps, so that said lumps can be separated from the charging material which then remains unfused.

In processes dependent upon desulphurization of heavy metal sulphides, it has been suggested to add such a sulphide in intimate mixture with material containing aluminum oxide and carbon, in order to thus facilitate a direct reaction between the sulphide, the aluminum oxide and the carbon.

This reaction has been secured. However, it has resulted in the formation of aluminum carbide, especially in utilizing substances having a relatively low sulphide content, such as a sulphide content below ten per cent. as well as in utilizing substances having a higher sulphide content. This made it difficult to produce refined aluminum oxide from the product. The formation of aluminum carbide is due to the fact that some aluminum is reduced to the metallic form, and this aluminum becomes a constituent in an iron alloy which is formed during the process, from bauxite and iron sulphide. As the metallic aluminum has greater affinity for carbon than iron, the aluminum will decompose the iron carbide with the formation of aluminum carbide that is insoluble in the iron and therefore enters the slag.

This disadvantage is essentially eliminated by the present invention whereby at least a part of the iron sulphide on account of its tendency to form large drops sinks into the metallic bath without having time to react with the carbon and aluminum oxide, so that the sulphide is dissolved in the metallic bath and reacts with the aluminum present therein. The aluminum sulphide so formed is separated from the iron and enters the slag. By separating metallic aluminum from the iron alloy in this way, the formation of aluminum carbide is diminished very substantially.

When heavy metal sulphides are used in the present process, as for example $FeS_2$, ZnS, these heavy sulphides give off all or a part of their sulphur at a temperature lower than the temperature of the heated reaction zone in the furnace. Hence iron or equivalent material is added, in order to combine with the sulphur which is thus liberated at the relatively low temperature. This iron is intimately mixed with the pyrite or zinc sulphide, and the mixture is formed into briquettes. The material of the briquettes can be added in the form of chips, granules or the like, that is, in such a shape that they easily take up the sulphur. In the briquetting, a suitable material is added, for instance bauxite, that easily can absorb moisture and later gives off a part thereof for binding the briquettes together. The quantity of such admixture should, however, according to the invention preferably not exceed 30% and is preferably kept between 10 and 20%. The quantity should not in any case be so great that it prevents the separation of the iron sulphide. The iron in the briquettes should for the same reason not be too finely pulverized. When using iron-pyrite briquettes, the proportion of iron is as a rule somewhat in excess of the quantity theoretically required for binding half the quantity of pyrite-sulphur as FeS. When using ZnS-iron-briquettes, the quantity of iron is preferably so chosen that it is more than sufficient to bind all the sulphur liberated by the decomposition of the zinc-sulphide, as FeS.

The briquettes may of course also contain a mixture of pyrite, iron and zinc sulphide. I can also use zinc sulphide ores that contain ZnS and pyrite or pyrotite. The bauxite is preferably added to the briquettes in uncalcined form. Bauxite present in the rest of the charge is, however, preferably added after it has been freed from water by calcination or sintering.

Whenever I refer to an aluminum sulphide in the claims, it is to be understood that I wish to include a product which contains BaS or MgS instead of the aluminum sulphide, and that I also wish to include a product which contains a mixture of said sulphide. Likewise, whenever I refer to iron sulphide in the claims, it is to be understood that I include zinc sulphide and that I also wish to include every form of iron sulphur compound, either artificial or natural.

I claim:—

1. The process of producing products containing aluminum oxide and sulphide of aluminum by melting the aluminum oxide containing materials with reducing agents and iron sulphide, the latter being added in lumps so that same will readily sink through the slag formed by the reaction into the heavy metals underlying the slag and will produce aluminum sulphide with the aluminum, contained in the heavy metals.

2. The process of producing products containing aluminum oxide and aluminum sulphide by melting the aluminum oxide containing materials with reducing agents and iron sulphide, the latter being added in the form of large lumps, aluminum oxide and aluminum sulphide being produced as reaction products and being absorbed in the slag produced in the reaction.

3. The process of producing products containing aluminum oxide and aluminum sulphide by melting the aluminum oxide containing materials with reducing agents and iron sulphide, the latter being added in the form of big lumps, the reaction products produced consisting of aluminum sulphide which is formed by interaction of the metal sulphide with the aluminum dissolved in the bath of heavy metals underlying the slag.

4. The process of producing products containing aluminum oxide and aluminum sulphide by melting the aluminum oxide containing materials with reducing agents and with iron sulphide, the latter being added in large lumps so as to sink by gravity through the slag produced into the heavy metal bath, produced by the reduction of the heavy metal oxides present.

5. The process of producing products containing aluminum oxide and aluminum sulphide by melting aluminum oxide containing materials with reducing agents and with iron sulphide, such sulphide being added in large lumps together with iron so that aluminum sulphide will be formed from the aluminum contained in the metal bath underlying the slag.

6. The process of producing products containing aluminum oxide and aluminum sulphide by melting the aluminum oxide materials with reducing agents and iron sulphide, the latter being added in the form of big lumps in the mixture of pyrites and iron, said mixture sinking by gravity through the slag formed into the underlying heavy metal bath.

7. The process of producing products containing aluminum oxide and aluminum sulphide by melting the aluminum oxide materials with reducing agents and iron sulphide, the latter being added in the form of big lumps in the mixture of pyrites and iron, said mixture sinking by gravity through slag formed into the underlying heavy metal bath and producing aluminum sulphide with the aluminum present in the latter.

8. The process of producing products containing aluminum oxide and aluminum sulphide by melting the aluminum oxide containing materials with reducing agents and iron sulphide, said sulphide being added in the form of lumps of a mixture with iron and uncalcined bauxite, said lumps sinking by gravity through the slag into the underlying heavy metals, where aluminum sulphide is formed as part of the reaction products.

In testimony whereof I have hereunto set my hand.

TURE ROBERT HAGLUND.